United States Patent Office 3,154,536
Patented Oct. 27, 1964

3,154,536
3-O-CARBAMYL-L-LYXOPYRANOSIDES AND PROCESS FOR PREPARING SAME
Hans Spiegelberg, Basel, and Bruno Peter Vaterlaus, Binningen, Switzerland, assignors to Hoffmann-La Roche Inc., Nutley, N.J., a corporation of New Jersey
No Drawing. Filed Jan. 17, 1962, Ser. No. 166,943
Claims priority, application Switzerland Jan. 27, 1961
17 Claims. (Cl. 260—210)

The present invention relates to a process for the preparation of novel sugar derivatives. More particularly, it relates to a process whereby an alkyl glycoside of a 5,5-dialkyl-4-O-alkyl-2-O-acyl-L-lyxopyranose is reacted with a chloroformic acid ester, and the resulting product converted into an L-lyxopyranosyl halide. The invention also relates to the conversion of the latter compound into other sugar derivatives.

The alkyl groups present in the starting materials, i.e. the 5,5 - diakyl - 4-O-alkyl-2-O-acyl-alkyl-L-lyxopyranosides, can be the same or different (except that the two alkyl groups in the 5-position are the same), and are preferably lower alkyl groups such as methyl, ethyl, propyl, isopropyl, butyl, etc. However, the alkyl groups located in the 1-position can also be a lower monocyclic aralkyl group, e.g. benzyl. The acyl group in the 2-position is the acyl radical from an aliphatic, preferably lower aliphatic, a lower monocyclic aralkyl, or a monocyclic aromatic monocarboxylic acid. Aromatic acyl groups preferably the benzoyl or lower alkyl or lower alkoxy substituted benzoyl groups, e.g. p-methoxy benzoyl, are especially suitable.

The 5,5 - dialkyl-4-O-alkyl-2-O-acyl-alkyl-lyxopyranosides employed as starting materials in the instant process can be prepared from 2-O-alkyl-3,5,6-tri-O-benzyl-alkyl-D-glucofuranosides, which are known compounds. As an example of the preparation of these known compounds, the anomer mixture of 2-O-methyl-3,5,6-tri-O-benzyl-methyl-D-glucofuranoside as prepared from D-glucose by its 1,2-monoacetone derivative, which is then tribenzylated, hydrolyzed in positions 1 and 2, and lastly methylated.

In order to convert an anomer mixture of a 2-O-alkyl-3,5,6-tri-O-benzyl-alkyl-D-glucofuranoside into a starting material employed in the present process, the D-glucofuranoside is converted into the corresponding D-glucofuranose by acid catalyzed hydrolysis. Thereafter the D-glucofuranose is oxidized to the corresponding D-γ-gluconolactone. By aminolysis of the above-obtained γ-lactone, for example, by treatment with ammonia or with a primary or secondary amine, such as methylamine, the -corresponding D-γ-gluconic acid amide is formed. Then the free hydroxyl group in the 4-position of the D-γ-gluconic acid amide is esterified with a sulfonic acid, for example, by treatment with methanesulfonic acid chloride. In the case of the above-mentioned anomer mixture of 2-O-methyl-3,5,6-tri-O-benzyl-methyl-D-glucofuranoside as starting material, 2-O-methyl-3,5,6-tri-O-benzyl-4-O-mesyl-D-γ-gluconic acid-N-methylamide is obtained. The next step consists in the solvolysis of the 2-O-alkyl-3,5,6-tri-O-benzyl-D-gluconic acid amide esterified in the 4-position with a sulfonic acid, whereupon a 2-O-alkyl-3,5,6-tri-O-benzyl-D-γ-galactonolactone is formed. By reaction of this lactone with an alkyl magnesium halide by the Grignard method, preferably employing one mole of lactone to two moles of organo-metallic compound, followed by hydrolysis of the reaction product, a 1,1 - dialkyl - 2-O-alkyl-3,5,6-tri-O-benzyl-D-galactonohexitol is obtained. The hydroxyl group in the 4-position of the above-obtained hexitol is then esterified with a lower aliphatic, a lower monocyclic aralkyl, or a monocyclic aromatic monocarboxylic acid, or a functional derivative thereof, such as the acid halide or anhydride. Preferred esterification agents are those which give the benzoyl or p-methoxybenzoyl group such as benzoyl chloride or p-methoxybenzoyl chloride. The esterification product is reductively debenzylated, and then subjected to a glycol splitting reaction, employing, for example, lead tetraacetate in methylene chloride solution, whereupon a 5,5-dialkyl-4-O-alkyl-2-O-acyl-L-lyxopyranose is formed. The latter compound is then acetalized with an acetalizing agent such as a lower aliphatic or lower monocyclic araliphatic alcohol to form the starting materials for the process of the present invention. A preferred starting material is 5,5-dimethyl-4-O-methyl-2-O-(benzoyl or p-methoxybenzoyl)-methyl-L-lyxopyranoside.

The first step of the process of the invention can be regarded as a substitution of the hydrogen atom of the hydroxyl group in the 3-position in the starting material with a potential carbamyl group. For this purpose the alkyl glycoside is reacted with a chloroformic acid ester of the formula

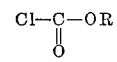

wherein R is a substituted, preferably monosubstituted lower alkyl or phenyl group, the substituents being nitro or cyano.
The preferred chloroformic acid ester is chloroformic acid p-nitrophenyl ester or chloroformic acid cyano-methyl ester. Advantageously, the reaction is carried out in the presence of an organic base as the reaction medium, such as, for example, pyridine.

In the second step of the process of the invention, the above esterification product, i.e. a 5,5-dialkyl-4-O-alkyl-3-O-(substituted alk- or aryl-oxycarbonyl)-2-O-acyl—alkyl-L-lyxopyranoside, is converted to the corresponding substituted L-lyxopyranosyl halide. This halide can be obtained in various ways. For example, the substituted L-lyxopyranosyl bromide can be obtained by treatment of the esterification product of the first step above with hydrogen bromide in glacial acetic acid. A suitable method of carrying out this reaction consists of operating in a glacial acetic acid solution and carrying out the bromination by addition of a 36% solution of hydrogen bromide in glacial acetic acid, for example, at room temperature.

The corresponding substituted L-lyxopyransoyl chloride can be prepared according to one of the following methods:
(A) The above-obtained bromide is treated with silver chloride in an inert organic solvent, for example, ether or methylene chloride or a mixture thereof, as the reaction medium, whereupon the bromide atom is exchanged for the chlorine atom.
(B) The reaction product obtained in the first step is treated with hydrogen chloride in nitromethane, preferably in the presence of acetyl chloride and at room temperature, or with asymmetric dichloro-dimethylether in the presence of a catalytic quantity of a Lewis acid, such as boron trifluoride etherate, preferably at an elevated temperature, for example, at about 50° to about 80° C.

The corresponding substituted L-lyxopyranosyl fluoride can also be prepared, preferably from the corresponding bromide. By one of the following two methods the fluorine atom is easily substituted for the bromine atom:
(A) Reaction of the bromide with silver fluoride in an organic solvent, e.g. absolute acetonitrile.
(B) Treatment of the bromide first with silver carbonate in a water-immiscible organic solvent to replace the halogen atom with a hydroxyl group to obtain the resulting substituted L-lyxopyranose. The preferred method of carrying out this process involves dissolving the bromide in an organic solvent, e.g. aqueous acetone, dioxane, or tetrahydrofuran, preferably in 90% aqueous acetone; and then under stirring at room temperature, reacting the bromide with silver carbonate. After the usual work-up and purification, the L-lyxopyranose is treated with hydrogen fluoride, preferably with aqueous hydrogen fluoride and at low temperatures, for example, at 0° to −20° C., preferably at −15° C.

Another feature of the present invention relates to the conversion of the substituted L-lyxopyranosyl halides of the invention into their corresponding substituted aryl glycosides. This reaction is carried out by reacting the substituted L-lyxopyranosyl halide with phenol or a substituted phenol, the reaction taking place in an acid medium. L-lyxopyranosyl chloride or bromide is preferably employed as the sugar component. As the phenolic component, substituted phenols, for example, alkyl or halogen substituted phenols, e.g. o-cresol, o-chlorophenol, or such similarly substituted monocyclic or bicyclic ring systems which contain the phenol, o-alkyl henol or o-halogen phenol formation, e.g.

An additional feature of the invention involves converting the above aryl glycoside of 5,5-dialkyl-4-O-alkyl-3-O-(substituted alk- or aryloxycarbonyl)-2-O-acyl-L-lyxo-pyranose to the aryl glycoside of 5,5-dialkyl-4-O-alkyl-3-O-carbamyl 2-O-(acyl or hydrogen) - L - lyropyranose. This reaction is carried out in the presence of a basic agent such as an alcoholic ammonia solution. In order to split off the O-acyl group in the 2-position this can be carried out by treatment with an alkali reagent, for example, through treatment with alcoholic barium alkoxide solution, such as barium methoxide in methanol.

The sugar derivatives which are obtained by the reaction of the alkyl glycoside starting materials with a chloroformic acid ester have the general formula:

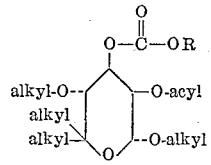

wherein R is a substituted, preferably monosubstituted lower alkyl or phenyl group, the substituents thereon being nitro, cyano, especially the cyanomethyl or p-nitrophenyl group; and acyl represents an acyl radical of an aliphatic, preferably lower aliphatic, lower monocyclic aralkyl, or monocyclic aromatic monocarboxylic acid, especially the benzoyl or lower alkyl or lower alkoxy substituted benzoyl group, e.g. p-methoxybenzoyl group; and the corresponding halides obtained therefrom have the formula:

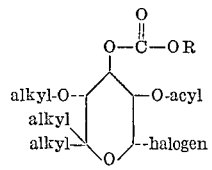

wherein R and acyl have the above meaning.

Compounds represented by the above formulas are novel compounds, useful for the preparation of 3-O-carbamyl-noviose which is the essential sugar in the antibiotic novobiocin, as well as for the preparation of novobiocin and similar compounds.

For example, 5,5-dimethyl-4-O-methyl-3-O-(p-nitrophenyloxycarbonyl) - 2 - O - benzoyl - α - methyl - L-lyxopyranoside can be converted into 3-O-carbamyl-noviose and intermediate in the synthesis of novobiocin by reaction with ammonia to form 5,5-dimethyl-4-O-methyl - 3 - O - carbamyl - 2 - O - benzoyl - α - methyl-L-lyxopyranoside, which is then debenzoylated to 5,5-dimethyl - 4 - O - methyl - 3 - O - carbamyl - α - methyl-L-lyxopyranoside. The latter is hydrolyzed to 3-O-carbamyl-noviose.

Example 1

7.7 g. of 5,5-dimethyl-4-O-methyl-2-O-benzoyl-methyl-L-lyxopyranoside are dissolved in 60 ml. of absolute pyridine and treated portionwise with 6.1 g. of the p-nitrophenyl ester of chloroformic acid. The mixture is stirred overnight and then diluted with 400 ml. of benzene. The benzene solution is washed several times with 3 N sulfuric acid then with 2 N sodium carbonate solution, and lastly, successively with water and saturated sodium chloride solution. After drying over sodium sulfate, the solvent is removed under vacuum. The resulting oil is crystallized by the addition of 15 ml. of ethanol containing a small amount of cyclohexane. There is obtained 7.5 g. of 5,5-dimethyl-4-O-methyl-3-O-(p - nitrophenyloxycarbonyl) - 2 - O - benzoyl - α-methyl-L-lyxopyranoside. This product is then purified by recrystallization from cyclohexane. Melting point: 148–149°; $[\alpha]_D = +151.5°$ (c.=1 in chloroform).

One g. of the above-obtained product is dissolved under mild warming in 2 ml. of glacial acetic acid and mixed with 2 ml. of a 36% solution of hydrogen bromide in glacial acetic acid at room temperature. After a few minutes crystallization begins. After filtration and washing with cyclohexane, there is obtained 850 mg. of 5,5-dimethyl - 4 - O - methyl - 3 - O - (p - nitrophenyloxycarbonyl) - 2 - O - benzoyl - α - L - lyxopyranosyl bromide. Melting point: 116–117°; $[\alpha]_D = +21°$ (c.=3 in chloroform). Recrystallization from methylene chloride/n-hexane raises the melting point to 118–120° C. (dec.).

The L-lyxopyranoside prepared in the first step above can be converted into 3-O-carbamyl-noviose as follows: 1.9 g. of 5,5-dimethyl-4-O-methyl-3-O-(p-nitrophenyloxycarbonyl)-2-O-benzoyl-α-methyl-L-lyxopyranoside is added to 5.0 ml. of methylene chloride and 10.0 ml. of 2 N methanolic ammonia. After about two hours the solution is evaporated under vacuum, the residue taken up in benzene, and the p-nitrophenol formed by the reaction extracted by two washings, each with 5 ml. of 2 N sodium carbonate solution. The benzene solution is washed with water until neutral, dried over anhydrous sodium sulfate, filtered and evaporated under vacuum. 1.35 g. of 5,5-dimethyl-4-O-methyl-3-O-carbamyl-2-O-benzoyl-α-methyl-I-lyxopyranoside is obtained as a colorless froth; $[\alpha]_D^{21} = +75°$ (c.=1 in 96% ethanol).

1.3 g. of this compound is dissolved in 50 ml. of absolute methanol and debenzoylated by the addition of 1.0 ml. of a 0.8 methanolic solution of barium methylate. After twelve hours the reaction mixture is neutralized with 1 N sulfuric acid, the precipitated barium sulfate filtered off, and the filtrate evaporated under vacuum. The oil which remains is taken up in acetone. After the addition of boiling n-hexane followed by cooling, 500 mg. of crystalline 5,5-dimethyl-4-O-methyl-3-O-carbamyl-α-methyl-L-lyxopyranoside of melting point 181–181.5° C.; $[\alpha]_D^{21} = -26°$ (c.=1 in 96% ethanol) is obtained (this substance is identical to the compound obtained by the acid hydrolysis of novobiocin in methanol).

By acid hydrolysis of the above compound with 1 N sulfuric acid, 3-O-carbamyl-noviose is obtained.

5,5 - Dimethyl - 4 - O - methyl - 2 - O - benzoyl-methyl-L-lyxopyranoside, which is used as the starting material, can be prepared as follows from the known 2 - O - methyl - 3,5,6 - tri - O - benzoyl - methyl - D-glucofuranoside: 200 g. of 2-O-methyl-3,5,6-tri-O-benzyl-methyl-D-glucofuranoside (prepared according to the process of F. Weygand, O. Trauth, Ber. 85 [1952], 57–60) is dissolved in 2000 ml. of 66% acetic acid and heated for 15 hours under reflux. The solution is allowed to cool and the solvent distilled off under the vacuum of a water pump and a bath temperature of 70° C. The residue, a viscous oil, is taken up in ether and washed alternately with 3 N sodium hydroxide solution and water. After drying and evaporation of the ether, there is obtained 190 g. of 2-O-methyl-3,5,6-tri-O-benzyl-D-glucofuranose in the form of a viscous oil.

100 g. of 2-O-methyl-3,5,6-tri-O-benzyl-D-glucofuranose is dissolved with stirring in 1000 ml. of methanol and 40 g. of barium carbonate mixed therewith. A solution of 45 g. of N-bromoacetamide in 500 ml. of methanol is dropped into the solution, which is cooled with ice to a temperature of 0–5° C., during the course of one minute. The resulting mixture is stirred for 4 hours at the same temperature. Thereafter another solution of 45 g. of N-bromoacetamide in 500 ml. of methanol is added thereto and the resulting mixture allowed to stand for several days at 0° C. The orange-red colored reaction solution is then poured with vigorous stirring into 500 ml. of a 15% sodium sulfite solution, whereupon decoloration occurs. After further additions of water, the mixture is extracted several times with ether. The extracts are combined, washed to neutrality, dried, and concentrated. The resulting 2-O-methyl-3,5,6-tri-O-benzyl-D-γ-gluconolactone can be used directly without further purification.

200 g. of 2-O-methyl-3,5,6-tri-O-benzyl-D-γ-gluconolactone is dissolved in 1500 ml. of absolute methanol in a round-bottom flask equipped with a stirrer, thermometer, and gas inlet tube, and the solution cooled to 0° C. 100 g. of methylamine gas is introduced into the solution during the course to 1 to 1½ hours under vigorous stirring. After several hours stirring the mixture is diluted with water and extracted with ether. The ether solution is washed successively with dilute sulfuric acid, dilute sodium carbonate solution, and lastly with water, then dried over sodium sulfate and concentrated. The residue consists of 200 g. of 2-O-methyl-3,5,6-tri-O-benzyl-D-γ-gluconic acid-N-methylamide in the form of a viscous oil.

200 g. of the above-obtained D-γ-gluconic acid-N-methylamide is dissolved in 2000 ml. of methylene chloride and cooled to 0° C. This solution is then treated with 320 ml. of absolute pyridine, and then during the course of 1 to 1½ hours, a solution of 32 ml. of mesyl chloride in 50 ml. of methylene chloride is added dropwise. After several hours stirring the same quantity of mesyl chloride is added once again and stirring continued. After the addition of water the methylene chloride solution is treated with dilute sulfuric acid, then with dilute sodium carbonate, and lastly washed with water, dried, and concentrated. To the still warm residue 700 ml. of ether is added thereto carefully with shaking, and the mixture is cooled quickly. The mesylate begins to crystallize immediately. After being allowed to stand at 0° for a short time, it is filtered with suction, the residue washed with ether, and dried. There is thus obtained 140 g. of 2-O-methyl-3,5,6-tri-O-benzyl-4-O-mesyl-D-γ-gluconic acid-N-methylamide of melting point 129–131° C.

300 g. of 2-O-methyl-3,5,6-tri-O-benzyl-4-mesyl-D-γ-gluconic acid-N-methylamide are dissolved in 3000 ml. of 66% acetic acid and heated under reflux during 15 hours. The solution is cooled, and the solvent is distilled off under the vacuum of a water pump at a bath temperature of 70° C. The residue, a viscous oil, is diluted with water and taken up in ether. The ether solution is first washed with dilute sodium carbonate solution, and then with water, dried, and concentrated. The resulting crude product, for purification purposes, is dissolved in benzene/ether (95:5), adsorbed on a 5-fold quantity of silica gel (Merck No. 7733), and eluted with a mixture of benzene/ether (95:55). After removal of the solvent there is obtained 220 g. of 2-O-methyl-3,5,6-tri-O-benzyl-D-γ-galactonolactone as a viscous oil $[\alpha]_D^{24}$ —45° (c.=4 in chloroform).

In a 4-liter round-bottom flask fitted with a stirrer, cooling bath, thermometer, and dropping funnel, 21.2 g. of magnesium, 122 g. of methyl iodide and 1000 ml. of anhydrous ether are mixed together to form a Grignard compound. To this mixture, cooled to a temperature of 20–25° C., a solution of 100 g. of 2-O-methyl-3,5,6-tri-O-benzyl-D-γ-galactonolactone in 1900 ml. of dry benzene is dropped thereinto during the course of 20 to 30 minutes. After stirring for several hours at room temperature the pale yellow-colored and somewhat turbid solution is hydrolyzed carefully by the addition of 500 ml. of 3 N sulfuric acid, the temperature in the solution being maintained between 20 and 30° C. by cooling. After the addition of an additional quantity of ether, the aqueous phase is separated and the ether solution washed consecutively with water and a 10% aqueous sodium thiosulfate solution, dried, and concentrated completely. There is thus obtained 102 g. of 1,1-dimethyl-2-O-methyl-3,5,6-tri-O-benzyl-galactonohexitol in the form of a viscous yellow oil having a specific rotation $[\alpha]_D^{24}$ between —49.5 to —51.5° (c.=4 in chloroform).

200 g. of the hydrolysis product obtained by the above procedure is dissolved in 800 ml. of dry pyridine and cooled to 0–5° C. To this solution 83 ml. of benzoyl chloride in 100 ml. of pyridine is dropped thereinto at the same temperature during the course of 30 minutes. After several hours stiring, ice water and ether are added, and the ether solution, after washing with dilute sulfuric acid and dilute sodium hydroxide solution, is worked up in the usual manner. There is obtained a practically quantitative yield of 1,1-dimethyl-2-O-methyl-3,5,6-tri-O-benzyl-4-O-benzoyl-D-galactonohexitol in the form of a viscous bright yellow oil having a specific rotation $[\alpha]_D^{22}$ between —5° and —7° (c.=4 in chloroform).

Into a five-liter hydrogenation flask equipped with cooling means 204 g. of 1,1-dimethyl-2-O-methyl-3,5,6-tri-O-benzyl-4-O-benzoyl-D-galactonohexitol dissolved in 1900 ml. of methanol is introduced. To this solution is added 20 g. of Dry Ice. As soon as the flask is filled with $CO_2$ gas, 15 g. of a 5% palladium-on-charcoal catalyst is added to the solution and the mixture hydrogenated at room temperature. After about two hours the theoretical quantity of hydrogen is taken up. The catalyst is filtered from the solution, and the solution completely concentrated under vacuum at a bath temperature of 40–45° C. The resulting still warm oil is taken up in 200 ml. of ether and shaken vigorously, whereupon spontaneous crystallization occurs. After allowing it to stand for several hours, the crystalline product is filtered off and dried. There is thus obtained 74 g. of 1,1-dimethyl-2-O-methyl-4-O-benzoyl-D-galactonohexitol of melting point 118–121° C.; $[\alpha]_D^{22}$ +40° to +43° (c.=1 in chloroform).

39.6 g. of the above-obtained substituted D-galactonohexitol is dissolved in 600 ml. of dry methylene chloride. To the resulting clear solution, a solution of 56 g. of lead tetraacetate in 300 ml. of dry methylene chloride is dropped thereinto during the course of one hour at room temperature. The reaction solution, which is brown-colored due to the precipitation of lead diacetate, is allowed to stand for several hours at room temperature with stirring. A slight excess of lead tetraacetate remains which can be detected through the blue coloration on moist iodine-starch paper. After destruction of the excess lead tetraacetate by dropwise addition of ethylene glycol, the reaction solution is filtered, successively washed with aqueous sodium carbonate solution and sodium chloride solution, dried, and concentrated completely. 35 g. of 5,5-dimethyl-4-O-methyl-2-O-benzoyl-L-lyxopyranose in the form of a colorless oil remains behind.

In a 500 ml. round-bottom flask equipped with a reflux condenser and a dropping funnel, 36 g. of the above-obtained L-lyxopyranose dissolved in 240 ml. of dry methanol is introduced and the mixture brought to the boiling point. Through the dropping funnel whose end lies just over the surface of the liquid, during the course of five minutes, is dropped 2.4 ml. of freshly distilled acetyl chloride. The solution is maintained during the course of four hours at the boiling temperature, then cooled slightly, and concentrated completely under the vacuum of a water pump. The oily residue is taken up in ether, the ether solution washed with 4% sodium bicarbonate solution and water, treated with sodium sulfate, and evaporated to dryness. 34.1 g. of 5,5-dimethyl-4-O-methyl-2-O-benzoyl-methyl-L-lyxopyranoside is obtained in the form of a glassy yellow oil $[\alpha]_D^{22}=+52°$ to $+57°$ (c.=1 in ethanol).

Other 5,5-dialkyl-4-O-alkyl-2-O-acyl-alkyl-L-lyxopyranosides are prepared according to the above process, except that the starting materials and other reactants are chosen to give the desired alkyl and acyl groups.

*Example 2*

One g. of 5,5-dimethyl-4-O-methyl-3-O-(p-nitrophenyloxycarbonyl)-2-O-benzoyl-α-L-lyxopyranosyl bromide is dissolved in 4 ml. of methylene chloride, and at room temperature dropped into a suspension of 1 g. of silver chloride in 20 ml. of absolute ether under stirring. After the end of the addition the mixture is stirred for another half hour and then heated for five minutes under reflux. The colorless solution is filtered from the silver salt, and the filtrate evaporated to dryness, whereupon 5,5-dimethyl-4 - O - methyl-3-O-(p-nitrophenyloxycarbonyl)-2-O-benzoyl-α-L-lyxopyranosyl chloride spontaneously crystallizes out. This compound is recrystallized from benzene/ether. Melting point: 143–144° C.; $[\alpha]_D^{20}=+46°$ (c.=1 in methylene chloride).

*Example 3*

500 mg. of 5,5 - dimethyl - 4 - O-methyl-3-O-(p-nitrophenyloxycarbonyl) - 2 - O - benzoyl-α-methyl-L-lyxopyranoside is dissolved in 4 ml. of asymmetric dichlorodimethyl ether and one drop of borontrifluoride etherate, and maintained for two hours at 80°. The gold-yellow solution is evaporated immediately under vacuum to dryness, and the oil which is obtained thereby is brought to crystallization by the addition of 2 ml. of ether. There is obtained thus the 5,5-dimethyl-4-O-methyl-3-O-(p-nitrophenyloxycarbonyl)-2-O-benzoyl-α-L-lyxopyranosyl chloride which is identical with the product obtained in Example 2.

The reaction, instead of being carried out in asymmetric dichloro-dimethyl ether and in the presence of borontrifluoride etherate, can also be carried out in a mixture of nitromethane/acetyl chloride saturated with hydrogen chloride gas. In the latter process the reaction mixture is allowed to stand for 24 hours at room temperature, the solvent evaporated off by concentration under vacuum at 35–40° C. and the residue crystallized from ether.

*Example 4*

1.5 g. of 5,5-dimethyl-4-O-methyl-3-O-(p-nitrophenyloxycarbonyl)-2-O-benzoyl-α-L-lyxopyranosyl bromide is dissolved in 4 ml. of methylene chloride and 25 ml. of absolute acetonitrile and dropped into a suspension of 1 g. of silver fluoride in 25 ml. of absolute acetonitrile under stirring at room temperature during the course of 30 minutes. After the end of the introduction, it is stirred for an additional hour, then the silver salt filtered off and the residue washed with 100 ml. of methylene chloride. The filtrate is evaporated under vacuum to dryness and taken up in cyclohexane, whereupon 5,5-dimethyl-4-O-methyl - 3 - O - (p-nitrophenyloxycarbonyl)-2-O-benzoyl-α-L-lyxopyranosyl fluoride crystallizes out. This is recrystallized from ethanol and exhibits a melting point of 156–158° C.; $[\alpha]_D^{25}=+184°$ (c.=1 in methylene chloride).

*Example 5*

1.1 g. of 5,5-dimethyl-4-O-methyl-3,O-(p-nitrophenyloxycarbonyl)-2-O-benzoyl-α-L-lyxopyranosyl bromide is dissolved in 40 ml. of 90% aqueous acetone and hydrolyzed with 1 g. of silver carbonate with stirring at room temperature during the course of 70 minutes. After filtration of the silver salt and evaporation of the solvent, the water which remains behind is azeotropically distilled off with benzene. The resulting viscous oil is dissolved in benzene, adsorbed on 25 g. of silica gel, and developed with 500 ml. of benzene. By elution with 250 ml. of ether, 0.68 g. of 5,5-dimethyl-4-O-methyl-3-O-(p-nitrophenyloxycarbonyl)-2-O-benzoyl-L-lyxopyranose in the form of a viscous oil is obtained, which can be crystallized by the addition of acetone/petroleum ether. Melting point: 158–160° C.; $[\alpha]_D^{22}=+246.5°$ (c.=1 in chloroform).

900 mg. of the above-obtained L-lyxopyranose is immediately added at $-15°$ C. to 25 ml. of aqueous hydrogen fluoride during the course of 15 minutes. After a further 15 minutes of reaction at 20°, it is poured into ice water and extracted with methylene chloride. The organic layer is separated, washed with saturated sodium bicarbonate solution and then with water. After drying and evaporation of the methylene chloride, an oil remains which is crystallized by the addition of ethanol. The resulting 5,5-dimethyl-4-O-methyl-3-O-(p-nitrophenyloxycarbonyl)-2-O-benzoyl - α - L-lyxopyranosyl fluoride melts at 155–156° C.; $[\alpha]_D=+189°$ (c.=1 in methylene chloride).

*Example 6*

1.05 g. of 5,5-dimethyl-4-O-methyl-3-O-(p-nitrophenyloxycarbonyl)-2-O-benzoyl-α-L-lyxopyranosyl bromide is dissolved in 25 ml. of absolute nitromethane under slight warming. To this solution 0.450 g. of o-cresol and 1.7 g. of silver phosphate is added and the mixture stirred for 18 hours at room temperature. The solution is diluted with ethyl acetate, the silver salt filtered off, and the acid solution washed to neutrality with water. After drying the organic layer over sodium sulfate and evaporation of the solvent under vacuum, the resulting oil is adsorbed on 20 g. of aluminum oxide in benzene-petroleum ether (1:1 by volume) and eluted with benzene. The eluate is evaporated off and the residue recrystallized from cyclohexane. The resulting 5,5-dimethyl-4-O-methyl - 3 - O - (p - nitrophenyloxycarbonyl) - 2 - O - benzoyl-α - o - cresyl - L - lyxopyranoside melts at 185° C.; $[\alpha]_D=+66°$ (c.=0.85 in chloroform).

We claim:
1. A compound having the formula

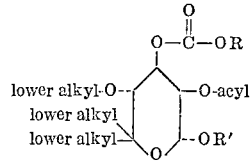

wherein R is selected from the group consisting of a substituted lower alkyl and a substituted phenyl group, the substituents attached thereto being selected from the group consisting of cyano and nitro, and acyl represents an acyl radical of a monocarboxylic acid selected from the group consisting of a lower alkyl monocarboxylic acid, a phenyl lower alkyl monocarboxylic acid, and a monocyclic aromatic monocarboxylic acid and R' is selected from the group consisting of lower alkyl and lower monocyclic aralkyl.

2. A compound having the formula

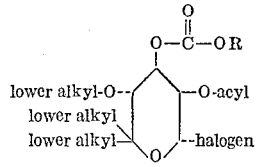

wherein R and acyl have the same meaning as in claim 1.

3. A compound of claim 2 wherein the acyl group is benzoyl.

4. A compound of claim 2 wherein the acyl group is lower alkoxy monosubstituted benzoyl.

5. A compound of claim 3 wherein R is a substituted phenyl group, the substituents attached thereto being selected from the group consisting of cyano and nitro.

6. A compound of claim 4 wherein R is a substituted phenyl group, the substituents attached thereto being selected from the group consisting of cyano and nitro.

7. 5,5 - dimethyl - 4 - O - methyl - 3 - O - (p - nitrophenyloxycarbonyl) - 2 - O - benzoyl - α - methyl - L-lyxopyranoside.

8. 5,5 - dimethyl - 4 - O - methyl - 3 - O - (p - nitrophenyloxycarbonyl) - 2 - O - benzoyl - α - L - lyxopyranosyl bromide.

9. 5,5 - dimethyl - 4 - O - methyl - 3 - O - (p - nitrophenyloxycarbonyl) - 2 - O - benzoyl - α - L - lyxopyranosyl chloride.

10. 5,5 - dimethyl - 4 - O - methyl - 3 - O - (p - nitrophenyloxycarbonyl) - 2 - O - benzoyl - α - L - lyxopyranosyl fluoride.

11. A process for the preparation of a compound having the formula

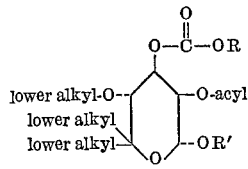

wherein R is selected from the group consisting of a substituted lower alkyl and a substituted phenyl group, the substituents attached thereto being selected from the group consisting of cyano and nitro, and acyl represents an acyl radical of a monocarboxylic acid selected from the group consisting of a lower aliphatic monocarboxylic acid, a lower monocyclic aralkyl monocarboxylic acid, and a monocyclic aromatic monocarboxylic acid and R' is selected from the group consisting of lower alkyl and lower monocyclic aralkyl; comprising the step of reacting an alkyl glycoside of a 5,5-di-lower alkyl-4-O-lower alkyl-2-O-acyl-L-lyxopyranose with a chloroformic acid ester of the formula

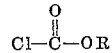

wherein R and acyl have the meanings given above.

12. A process according to claim 11 wherein said compound is then reacted with a halogenating agent to form a compound defined by claim 2.

13. A process according to claim 11 wherein the alkyl glycoside of a 5,5-di-lower alkyl-4-O-lower alkyl-2-O-acyl - L - lyxopyranose is 5,5 - dimethyl-4-O-methyl-2-O-(aroyl)-methyl-L-lyxopyranoside; the aroyl group being selected from the group consisting of benzoyl and p-methoxybenzoyl.

14. A process according to claim 11 wherein the chloroformic acid ester is the p-nitrophenyl ester of chloroformic acid.

15. A process according to claim 12 wherein the halogenating agent is hydrogen bromide.

16. A process according to claim 12 wherein the halogenating agent is a chlorinating agent selected from the group consisting of hydrogen chloride and asymmetric dichlorodimethylether.

17. A process for converting the bromide product of claim 15 to the corresponding chloride comprising the step of reacting said bromide product with silver carbonate in a water-immiscible solvent.

References Cited in the file of this patent
UNITED STATES PATENTS
2,938,900    Walton _____ May 31, 1960

UNITED STATES PATENT OFFICE
CERTIFICATE OF CORRECTION

Patent No. 3,154,536                      October 27, 1964

Hans Spiegelberg et al.

It is hereby certified that error appears in the above numbered patent requiring correction and that the said Letters Patent should read as corrected below.

Column 1, line 33, for "-alkyl-lyxopyrano-" read -- -alkyl-L-lyxopyrano- --; column 3, line 21, for "henol" read -- phenol --; line 25, for "aryloxcarbonyl" read -- aryloxycarbonyl --; line 27, for "-lyropyranose" read -- -lyxopyranose --; column 4, line 46, for "-I-" read -- -L- --; line 51, for "0.8" read -- 0.8 N --; same column 4, line 68, for "benzoyl" read -- benzyl --; column 5, line 59, for "-4-mesyl-" read -- -4-O-mesyl- --; line 71, for "(95:55) read -- (95:5) --; line 73, for $$[\alpha]_D^{24} - 45°$$ read $$[\alpha]_D^{24} = -45°$$

column 6, line 26, for "stiring" read -- stirring --; lines 30 and 31, for "-ben[zyl-" read ---benzyl- --; line 51, for $$[\alpha]_D^{22} +40°$$ read $$[\alpha]_D^{22} = +40°$$

Signed and sealed this 11th day of May 1965

(SEAL)
Attest:

ERNEST W. SWIDER                      EDWARD J. BRENNER
Attesting Officer                     Commissioner of Patents